Dec. 26, 1922.
L. E. ALKIRE ET AL.
VENTILATING SYSTEM FOR VEHICLES.
FILED NOV. 22, 1921.
1,439,681.
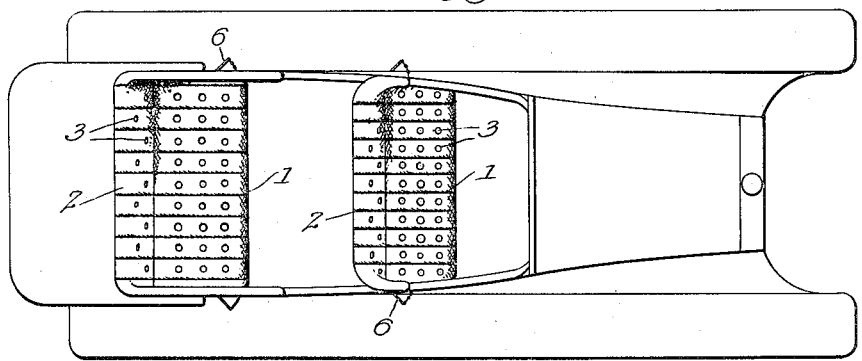
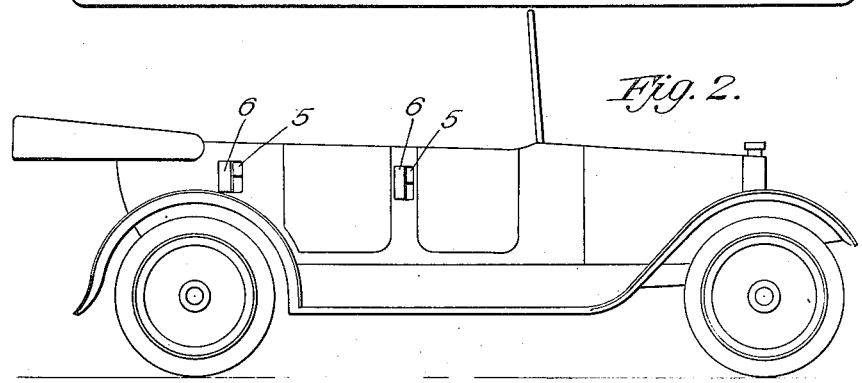
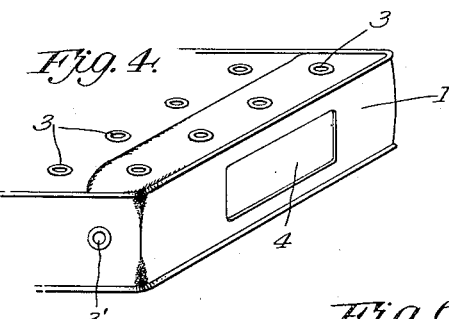
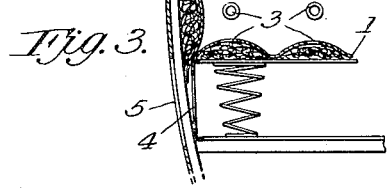
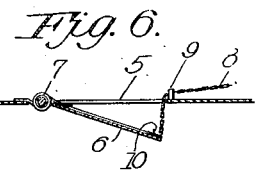
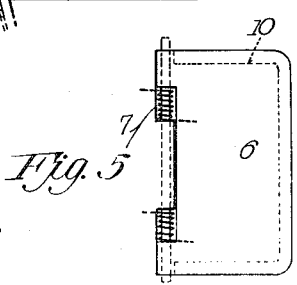
L.E. Alkire
W.H. Carter
INVENTOR
BY Victor J. Evans
ATTORNEY
WITNESS:
G.F. Baker
B. Middleton

UNITED STATES PATENT OFFICE.

LU EMMA ALKIRE AND WILEY HOWARD CARTER, OF FOREST CITY, MISSOURI.

VENTILATING SYSTEM FOR VEHICLES.

Application filed November 22, 1921. Serial No. 517,066.

*To all whom it may concern:*

Be it known that we, LU EMMA ALKIRE and WILEY HOWARD CARTER, citizens of the United States, residing at Forest City, in the county of Holt and State of Missouri, have invented new and useful Improvements in Ventilating Systems for Vehicles, of which the following is a specification.

This invention relates to a ventilating system for automobiles, the general object of the invention being to provide means for passing air to the cushions of the automobile in order to provide comfortable riding in warm weather.

Another object of the invention is to provide means for controlling the circulation of air through the cushion.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a plan view of an automobile supplied with our invention.

Figure 2 is a side elevation.

The remaining figures are detail views.

As shown in these views the seat cushions 1 and the backs 2 of the automobile are provided with perforations 3 for the circulation of air. These perforations may be formed by eyelets secured to the covering of the seats and backs. Some of the perforations are located in the front edge of each cushion, as shown at 3'. A large hole 4 is formed in one edge of each seat cushion. Openings 5 are formed in the sides of the automobile on both sides of the rear doors thereof, these openings extending through the walls and communicating with the holes 4 in the seat cushions and with the back so as to conduct air to the perforations. The openings 5 are controlled by hinged doors 6 which have their hinged edges at the rear and these doors are normally held open by the springs 7. Chains 8 having hooks 9 thereon are connected with the doors for holding them in closed position or in adjusted open position.

It will thus be seen that when the doors are open or partly opened air will enter the openings and will circulate through the cushions and back and pass through the perforations therein so as to keep the cushions and back cool in hot weather. In cold weather the doors can be closed and held in closed position by the chains and said chains will act to hold the doors in open position to any desired extent. Strips 10 of felt or the like may be used to make an air tight closure when the doors are shut.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:

In combination with a seated vehicle body having openings in its side walls adjacent the seat, a cushion for the seat having apertures in the top and front edge and enlarged openings in its ends registering with the openings in the car body, closures for the body openings, and means for adjusting the closures to various positions.

In testimony whereof we affix our signatures.

LU EMMA ALKIRE.
WILEY HOWARD CARTER.